United States Patent
George et al.

(10) Patent No.: US 12,384,362 B2
(45) Date of Patent: Aug. 12, 2025

(54) METHOD FOR DETERMINING AN EVASION TRAJECTORY FOR A VEHICLE

(71) Applicant: Valeo Schalter und Sensoren GmbH, Bietigheim-Bissingen (DE)

(72) Inventors: Ashwin Dayal George, Bietigheim-Bissingen (DE); Youssef Ghaly, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 189 days.

(21) Appl. No.: 18/019,683

(22) PCT Filed: Jul. 28, 2021

(86) PCT No.: PCT/EP2021/071099
§ 371 (c)(1),
(2) Date: Feb. 3, 2023

(87) PCT Pub. No.: WO2022/028973
PCT Pub. Date: Feb. 10, 2022

(65) Prior Publication Data
US 2023/0303064 A1   Sep. 28, 2023

(30) Foreign Application Priority Data

Aug. 6, 2020   (DE) ............... 10 2020 120 773.5

(51) Int. Cl.
*B60W 30/00*   (2006.01)
*B60W 10/184*  (2012.01)
(Continued)

(52) U.S. Cl.
CPC .......... *B60W 30/09* (2013.01); *B60W 10/184* (2013.01); *B60W 10/20* (2013.01);
(Continued)

(58) Field of Classification Search
CPC .... B60W 30/09; B60W 10/184; B60W 10/20; B60W 30/0953; B60W 30/0956;
(Continued)

(56) References Cited

U.S. PATENT DOCUMENTS

| | | | |
|---|---|---|---|
| 2008/0281521 A1* | 11/2008 | Shirato | .............. B60T 7/22 701/301 |
| 2009/0138201 A1* | 5/2009 | Eckstein | ............ B62D 15/0265 701/301 |

(Continued)

FOREIGN PATENT DOCUMENTS

| | | |
|---|---|---|
| DE | 102005002760 A1 | 8/2005 |
| DE | 102004056120 A1 | 5/2006 |

(Continued)

OTHER PUBLICATIONS

International Search Report and Written Opinion in corresponding International Application No. PCT/EP2021/071099, mailed Oct. 1, 2021 (10 pages).

(Continued)

*Primary Examiner* — Mahmoud S Ismail
(74) *Attorney, Agent, or Firm* — Osha Bergman Watanabe & Burton LLP

(57) ABSTRACT

A method for determining an evasion trajectory for a vehicle to evade one or more objects is disclosed. The method involves recognizing a first object in a predicted trajectory of the vehicle, determining a lateral evasion distance left with respect to the first object, determining a lateral evasion distance right with respect to the first object, selecting the smaller one of the lateral evasion distance left and lateral evasion distance right as a first ideal lateral evasion distance, and determining a first ideal evasion trajectory on which the vehicle passes the object depending on the first ideal lateral evasion distance.

8 Claims, 3 Drawing Sheets

(51) Int. Cl.
*B60W 10/20* (2006.01)
*B60W 30/09* (2012.01)
*B60W 30/095* (2012.01)
*B62D 15/02* (2006.01)
*B60W 50/14* (2020.01)

(52) U.S. Cl.
CPC .... *B60W 30/0953* (2013.01); *B60W 30/0956* (2013.01); *B62D 15/0265* (2013.01); *B60W 2050/146* (2013.01); *B60W 2510/20* (2013.01); *B60W 2520/10* (2013.01); *B60W 2520/105* (2013.01); *B60W 2540/00* (2013.01); *B60W 2554/801* (2020.02); *B60W 2554/802* (2020.02); *B60W 2710/18* (2013.01); *B60W 2710/20* (2013.01)

(58) Field of Classification Search
CPC ..... B60W 2554/802; B60W 2554/801; B60W 2050/146; B60W 2510/20; B60W 2520/10; B60W 2520/105; B60W 2540/00; B60W 2710/18; B60W 2710/20; B62D 15/0265
USPC .......................................................... 701/41
See application file for complete search history.

(56) References Cited

U.S. PATENT DOCUMENTS

| | | | |
|---|---|---|---|
| 2015/0120137 A1 | 4/2015 | Zeng et al. | |
| 2017/0236422 A1 | 8/2017 | Naka et al. | |
| 2020/0121215 A1 | 4/2020 | Hyde et al. | |
| 2021/0284237 A1* | 9/2021 | Miyano | B62D 15/0265 |

FOREIGN PATENT DOCUMENTS

| | | | | |
|---|---|---|---|---|
| DE | 102004062496 A1 | 7/2006 | | |
| DE | 102009020649 A1 | 11/2010 | | |
| DE | 102014206344 A1 | 10/2015 | | |
| EP | 1990250 A2 | 11/2008 | | |
| JP | 2008-308152 A | 12/2008 | | |
| JP | 2013-079068 A | 5/2013 | | |
| JP | 2013-126823 A | 6/2013 | | |
| JP | 2016-511183 A | 4/2016 | | |
| JP | 2017-114427 A | 6/2017 | | |
| JP | 2017-125997 A | 7/2017 | | |
| WO | WO-2020121215 A1 * | 6/2020 | | B60W 30/09 |

OTHER PUBLICATIONS

German Search Report issued in corresponding German Application No. 10 2020 120 773.5, dated Jan. 21, 2021 (8 pages).

Office Action Issued in Corresponding JP Application No. 2023-507817, dated May 31, 2024. (9 Pages with English Translation).

* cited by examiner

METHOD FOR DETERMINING AN EVASION TRAJECTORY FOR A VEHICLE

CROSS-REFERENCE TO RELATED APPLICATIONS

This application is a national stage application filed under AIA 35 U.S.C. § 371 of International Patent Application No. PCT/EP2021/071099, filed on Jul. 28, 2021, which is incorporated by reference herein in its entirety. This application also claims the benefit of German Patent Application No. DE 102020120773, filed on Aug. 6, 2020, which is incorporated by reference herein in its entirety.

The present invention relates to a method for determining an evasion trajectory for a vehicle to evade one or more objects, and to a computer program.

Currently there are collision mitigation braking systems (CM BS) and autonomous emergency braking systems which assist a driver of a vehicle to prevent or mitigate situations which may result in a collision with an object, like a pedestrian, animal or another vehicle or another object in the vehicle path. Collisions may be caused by an inattentive or distracted driver or by poor visibility. Some of these systems also have the capability to steer the vehicle away from a detected object in the path of the vehicle to avoid an imminent collision. There is only a limited number of such systems available, and the capabilities of these systems that steer the vehicle away from an object are currently limited.

US 2015/0120137 A1 concerns a method for calculating a virtual target path around a target object that includes providing scan points identifying detected objects.

It is one object of the present invention to provide an improved method for evading one or more objects on the trajectory of a vehicle.

Accordingly, there is provided a method for determining an evasion trajectory for a vehicle to evade one or more objects, the method comprising the steps:
  a) recognizing a first object in a predicted trajectory of the vehicle,
  b) determining a lateral evasion distance left with respect to the first object,
  c) determining a lateral evasion distance right with respect to the first object,
  d) selecting the smaller one of the lateral evasion distance left and lateral evasion distance right as a first ideal lateral evasion distance, and
  e) determining a first ideal evasion trajectory on which the vehicle passes the object depending on the first ideal lateral evasion distance.

This method has the advantage of determining an evasion trajectory which will allow the vehicle to pass the object with a minimum amount of additional travel and thereby to maintain vehicle stability during the evasion maneuver.

The "lateral evasion distance left" is the lateral distance from the vehicle's central longitudinal axis in plan view towards the left outer edge of the first object (to which, preferably, a safety distance is added). The "lateral evasion distance right" is the lateral distance from the vehicle's central longitudinal axis in plan view towards the right outer edge of the first object (to which, preferably, a safety distance is added).

After determining the first ideal evasion trajectory, this trajectory is either displayed to the driver on a vehicle HMI (Human-Machine-Interface) such as a screen and/or the vehicle's control unit assists the driver in driving along said trajectory (so-called driver assistance function). Examples of driver assistance functions include any of the automation levels 1 to 5 as defined by the Society of Automotive Engineers (SAE), such as Adaptive Cruise Control (ACC), Lane Keep Assist (LKA), Traffic Jam Assist (TJA), Highway Assist (HWA), Traffic Jam Pilot (TJP), collision mitigation braking systems (CMBS), as well as higher automated systems configured to enable semi or fully automated driving of the vehicle.

A control unit, which is for example a central electronic control unit of the vehicle, may be configured to implement some or all of the method steps explained herein. The control unit may be implemented using hardware and/or software and may include a microprocessor, RAM, ROM etc.

According to an embodiment, the method comprises further the steps:
  rejecting, if a second object is detected on the first ideal evasion trajectory, the ideal lateral evasion distance in favor of the other one of the lateral evasion distance left and lateral evasion distance right which is then determined to be a second ideal lateral evasion distance, and
  determining a second ideal evasion trajectory on which the vehicle passes the object depending on the second ideal lateral evasion distance.

This method serves to enhance safety by checking if there is a second object in the ideal evasion trajectory. Thereby, a collision with this second object during the evasion steering system can be avoided. After determining the second ideal evasion trajectory, this trajectory is either displayed to the driver on a vehicle HMI and/or the vehicle's control unit assists the driver in driving along said trajectory.

According to an embodiment, the method comprises further
  determining one or more virtual lines, and/or
  determining the first and/or second ideal evasion trajectory depending on the first and/or second ideal lateral evasion distance and the one or more virtual lines.

This step helps to guide the vehicle in the absence of any other objects. The virtual lines delineate the corridor for the vehicle to pass through during the evasion maneuver. The one or more virtual lines may be determined using a virtual width, indicative e.g. of a width of the vehicle.

According to an embodiment, the method comprises further
  comparing a measured distance between the vehicle and the object with a minimum predicted longitudinal distance which is a predetermined distance between the vehicle and the object to start a predetermined reaction based on current speed, steering capability and deceleration capability of the vehicle.

Depending on the distance between vehicle and object, there is the need to determine if certain reactions like braking or steering are necessary or safely possible. This serves to enhance vehicle safety and stability when approaching and possibly passing the object.

According to an embodiment, the method comprises further
  repeating the step of comparing the measured distance between the vehicle and the object with the minimum predicted longitudinal distance until the minimum predicted longitudinal distance is equal to or smaller than a first predetermined distance, at which distance the vehicle will start partial braking.

This step contributes to vehicle safety because at a distance less than the first predetermined distance it is no longer possible to perform an evasion maneuver by steering at the current speed of the vehicle while maintaining lateral vehicle stability. This serves to avoid swerving or skidding which is harder to control.

According to an embodiment, the method comprises further repeating the step of comparing the measured distance between the vehicle and the object with the minimum predicted longitudinal distance until the minimum predicted longitudinal distance is equal to or smaller than a second predetermined distance, at which distance the vehicle will start full braking.

This step contributes to vehicle safety because at a distance less than the second predetermined distance it is no longer possible to perform an evasion maneuver by steering at the current speed of the vehicle while maintaining lateral vehicle stability. Therefore, partial braking is no longer sufficient at this point. Full braking has to be applied to maintain vehicle safety.

According to an embodiment, the method comprises further repeating the step of comparing the measured distance between the vehicle and the object with the minimum predicted longitudinal distance until the minimum predicted longitudinal distance is equal to or smaller than a third predetermined distance, which distance is the distance of a point of no return, wherein the point of no return is determined as the point at which the object can no longer be avoided by steering.

When the vehicle is approaching the object even more, i.e. when the vehicle passes the third predetermined distance, the remaining distance between vehicle and object has become too short to perform a lateral evasion maneuver. In this case lateral stability cannot be maintained when performing evasive steering. When lateral stability is lost, the consequences can be more serious than a possible collision with the object. Thus, this step serves to maintain vehicle safety.

According to an embodiment, the method comprises further the steps:
if it is determined that the driver is steering in the direction of the first or second ideal evasion trajectory, performing assisted steering according to the first or second ideal evasion trajectory,
if it is determined that the driver is not steering in the direction of the first or second ideal evasion trajectory, if the vehicle has reached the first predetermined distance but has not reached the third predetermined distance, performing automatic steering according to the first or second ideal evasion trajectory, and
deactivate an emergency braking routine.

This part of the method serves to perform the evasion maneuver. Thereby, it is possible to maintain vehicle stability while evading the object, be it under driver control with assistance by the evasive steering system or under automatic control of the computer of the vehicle. In both cases, vehicle stability is maintained by deactivating emergency braking because when emergency braking is applied, it is difficult to maintain vehicle stability during the evasion maneuver. These steps serve to maintain vehicle stability during the evasion maneuver.

According to an embodiment, the method comprises further that the first object or the second object is being recognized by an environmental sensor, the environmental sensor preferably comprising at least one of a camera, a RADAR sensor, a LI DAR sensor, a laser scanner, an infrared sensor, a stereoscopic camera and an ultrasonic sensor.

In a modification, a computer program product comprises instructions which, when the program is executed by a computer, cause the computer to carry out the method described above.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

Figure 1:
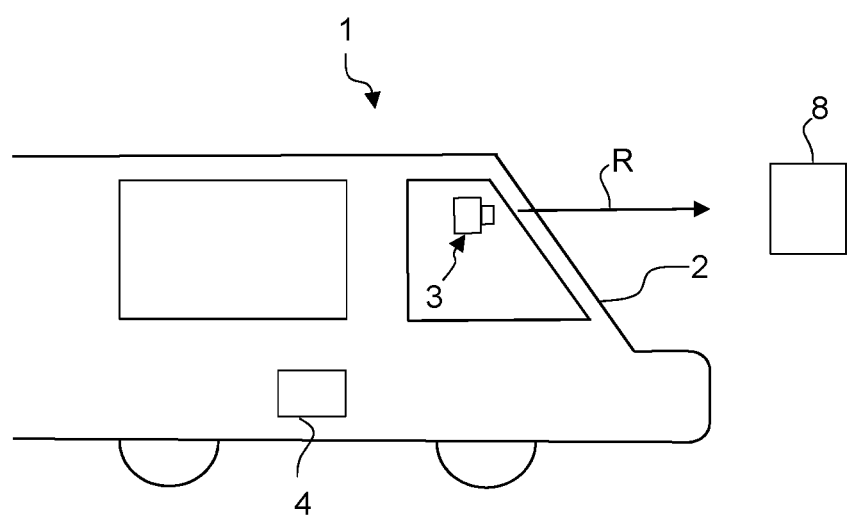
FIG. 1 shows, in a side view, a vehicle equipped with a camera which is detecting an object.

FIG. 1 is a schematic side view of a vehicle 1 approaching an object 8. The vehicle is equipped with a camera 3. The camera 3 is directed in the direction of the arrow R so that it can detect an object 8 in the predicted trajectory of the vehicle 1.

Figure 2:
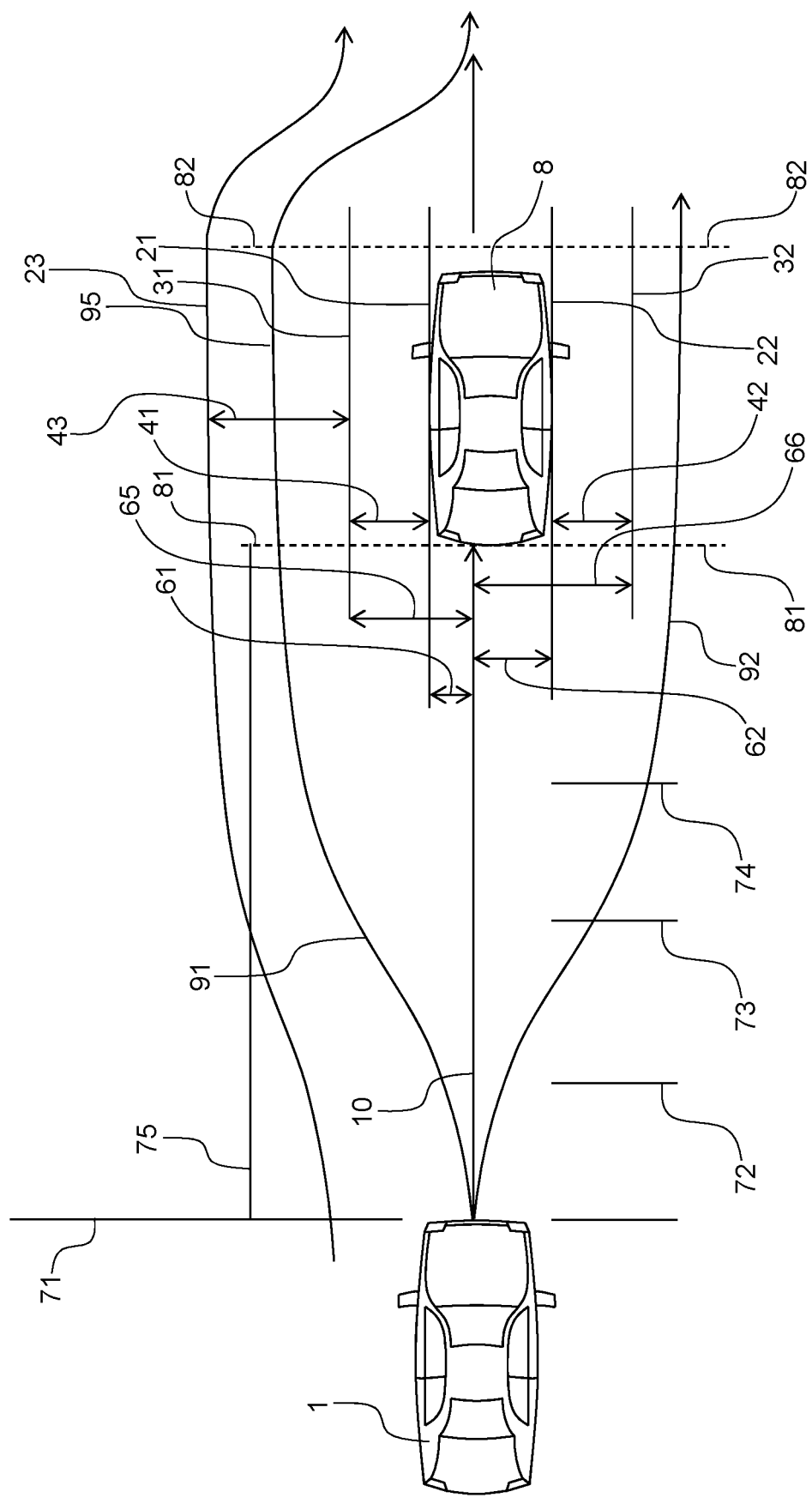
FIG. 2 shows, in a top view, the vehicle approaching another vehicle.

FIG. 2 is a top view showing the vehicle 1 approaching an object 8 (also "first object" herein) which, in this example, is another vehicle. The vehicle 1 has a planned trajectory 10 which is the predicted vehicle path as calculated by a control unit 4, e.g. based on data from environmental sensors, vehicle odometery and GPS navigation system. Based on information from the camera 3, the control unit 4 (for example the vehicle's central electronic control unit—"ECU") determines the left and right edges of the object 8 in the predicted trajectory 10 and assigns each of these edges a virtual line 21, 22 which runs parallel to the predicted trajectory 10. Based on these virtual lines 21 and 22, the control unit 4 determines an overlap for each left and right side of vehicle 1. The overlap on the left side is designated with reference numeral 61 and the overlap on the right side is labelled with reference numeral 62.

It should be noted that the camera 3 is only an example of an environmental sensor which is being used in order to detect objects around the vehicle 1. Other environmental sensors which can be used are RADAR sensors, LI DAR sensors, laser scanners, infrared sensors, stereoscopic cameras and ultrasonic sensors. It is further possible that more than one type of these sensors is being used. If more than one type of sensor is being used, the signals of different sensors are being evaluated in combination by the control unit 4 in order to detect an object like the first object 8 or other objects in the environment of the vehicle 1. Depending on the type of sensor, the mounting position of the sensor is determined to be e.g. near the top of the windshield or in another position of the vehicle so that the sensor is able to scan the area in the path of the vehicle.

Preferably, the vehicle 1 passes the object 8 not only with its outer edges at the virtual lines 21 and 22 but with a safety distance designated with reference numeral 41 for the left-hand side of object 8 and reference numeral 42 for the right-hand side of the object 8. The overlap left 61 and the safety distance left 41 are added to obtain the lateral evasion distance left 65. The overlap right 62 and the safety distance right 42 are added to obtain the lateral evasion distance right 66.

Figure 3:
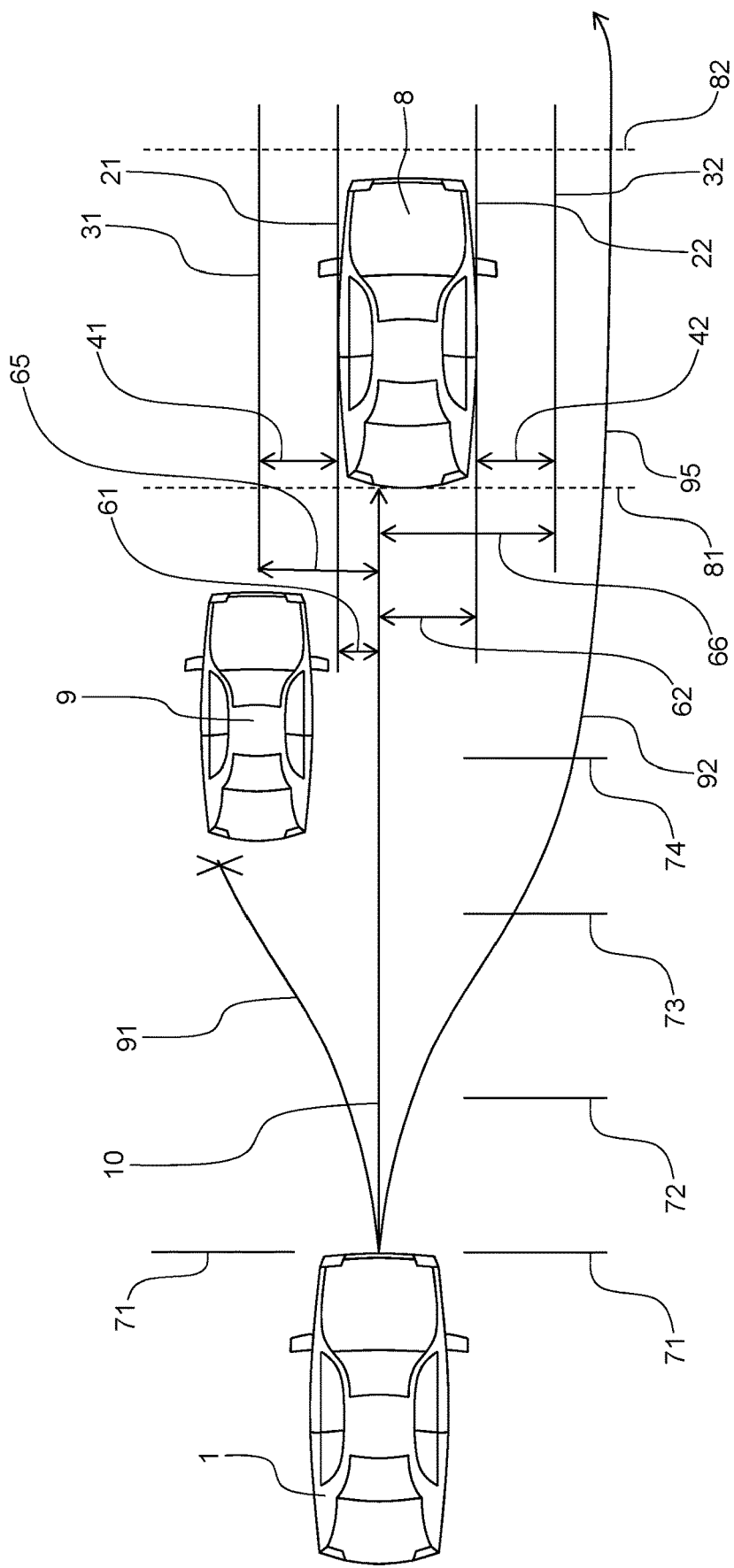
FIG. 3 shows, in a top view, the vehicle approaching the other vehicle with a further vehicle blocking one evasion trajectory.

Taking into account the safety distances 41, 42, the control unit 4 calculates a pair of virtual lines labelled 31 and 32. With these virtual lines, the control unit 4 determines ideal potential evasion trajectories 91 and 92 on which the vehicle 1 might pass the object 8 on the left or right hand side. The selection between the potential evasion trajectories 91 and 92 is normally performed by selecting the shorter of the trajectories 91 and 92. In FIG. 2, this will be trajectory 91 which therefore is determined as the ideal evasion trajectory 95. However, it is possible that an object 9 (also "second object" herein), which is shown in FIG. 3, is detected by the camera 3. If the vehicle 1 would be travelling along trajectory 91 as shown in FIGS. 2 and 3, a collision with the object 9 would occur as indicated by X in FIG. 3. Therefore, the control unit 4 discards the shorter evasion trajectory 91, which had been selected as ideal evasion trajectory 95 in FIG. 2. Instead, as shown in FIG. 3, the control unit 4 will select the trajectory 92 as ideal evasion trajectory 95.

In FIG. 2 the reference numeral 71 refers to the front end of the vehicle 1, and the rear end of the object 8 is indicated by dashed line 81. The current distance between rear end 81 and the front end 71 is indicated by 75. In order to safely pass the object 8, the vehicle 1 needs to pass/cover the current distance 75 (up to the dashed-line 82) but also a longitudinal safety distance indicated by dashed line 82 needs to be accounted for by the control unit 4. This longitudinal safety distance is determined by the relative speed between vehicle 1 and object 8, which object 8 may be another vehicle travelling at a slower speed than vehicle 1. It should be clear from the above that in the case where no further object 9 is detected by camera 3 on trajectory 91, this trajectory 91 will be maintained as the ideal evasion trajectory 95, as shown in FIG. 2.

After determining the ideal evasion trajectory 95, the control unit 4 determines the minimum predicted longitudinal distance which is necessary for the vehicle to avoid the object 8 by steering. This minimum longitudinal distance shall be computed by using the current speeds of vehicle 1 and object 8 as well as using a predetermined lateral acceleration. Such a lateral acceleration will arise during performing the steering maneuver. For this purpose, there are also further distances calculated by the control unit 4. One of these distances between object 8 and vehicle 1 is indicated by line 72. At this distance from object 8, vehicle 1 will be caused by the host to perform partial braking. At a closer distance from object 8, indicated by numeral 73, the host will cause vehicle 1 to start full braking. The closest distance to object 8 as it is indicated in FIGS. 2 and 3 is labelled 74 and indicates the distance of so-called point of no return. If and when vehicle 1 arrives at line 74, it will no longer be possible to avoid a collision by lateral steering.

After determining the ideal lateral evasive distance (but, as the case may be, before determining the ideal evasion trajectory 95), the control unit 4 determines the virtual line 23 (which may correspond to the virtual outer edge of the vehicle 1) in the absence of any other detected objects like lane markers, round boundaries, vehicles, barriers, pavements, as shown in FIG. 2. The virtual line 23 is determined using a virtual width 43 measured from the virtual line 31. The virtual width 43 is, e.g., indicative of the width of the vehicle 1 and other parameters as required. The virtual width 43 is stored in the memory of the control unit 4 as a predetermined value. It may be calculated by taking into account the current and predicted speeds of vehicle 1 along the ideal evasion trajectory. The virtual line 23 is shown in FIG. 2 as not parallel to the ideal evasion trajectory 95 because it also depends on the current speed of vehicle 1. When vehicle 1 arrives at dashed line 81, the vehicle speed will be lowest. Correspondingly, the virtual width 43 can be low, because it is easier to maintain lateral stability of the vehicle at lower speeds. At other points of the trajectory, the virtual width 43 has to be larger, because the vehicle will be travelling at higher speed and consequently, it is more difficult to maintain lateral stability. Alternatively, it can be calculated based on other detected objects like vehicles, lane markers, other boundaries, barriers or pavements.

Then, the control unit 4 computes or adapts the ideal evasion trajectory 95 based on the virtual lines 23, 31. In a further step, the control unit 4, based on the computed or adapted ideal evasion trajectory 91, 92, 95, computes the steering which is necessary to perform the evasive lateral steering maneuver and ensures lateral vehicle stability by controlling the vehicle 1 within the corridor bounded by the virtual line 31 in FIG. 2 on the inner side and by the virtual line 23 on the outer side.

The driver may already be steering in the vehicle 1 in the same direction as the ideal evasion trajectory 95. In this case, the control unit 4 will assist the driver using driving assistance functions to ensure that the vehicle 1 stays within the corridor bounded by the virtual line 31 and the virtual line 23. Another possibility is that the control unit 4, if the driver does not perform steering, does no longer perform only assistance functions, but starts to fully automatically steer the vehicle 1 along the ideal evasion trajectory 95 before the point of no return 74 is reached. Emergency braking will be disabled in both cases of either assisted or fully automatic steering along the ideal evasion trajectory 95.

Although the present invention has been described in accordance with preferred embodiments, it is obvious for the person skilled in the art that modifications are possible in all embodiments.

REFERENCE NUMERALS

1 vehicle
3 camera
4 control unit
8 first object
9 second object
10 predicted trajectory
21-23 virtual lines
31 lateral evasion line left
32 lateral evasion line right
41 safety distance left
42 safety distance right
43 virtual width
61 overlap left
62 overlap right
65 lateral evasion distance left
66 lateral evasion distance right
71 position of vehicle front end
72 position start partial braking
73 position start full braking
74 point of no return
75 measured distance
81 position of object rear end
82 position safety distance from first object
91 first ideal evasion trajectory 92 second ideal evasion trajectory
95 ideal evasion trajectory
S1-S18 steps

The invention claimed is:

1. A method for determining an evasion trajectory for a vehicle to evade one or more objects, the method comprising:
    recognizing a first object in a predicted trajectory of the vehicle with an Electronic Control Unit (ECU) of the vehicle;
    determining a left edge and a right edge of the first object in the predicted trajectory;
    assigning a left virtual line to the left edge and a right virtual line to the right edge, where each of the left virtual line and the right virtual line run parallel to the predicted trajectory;
    determining a left overlap for a left side of the vehicle and a right overlap for a right side of the vehicle based upon the left virtual line and the right virtual line, respectively;
    determining a lateral evasion distance left with respect to the first object with the ECU, where the lateral evasion distance left is determined by adding the left overlap and a safety distance left;
    determining a lateral evasion distance right with respect to the first object with the ECU, where the lateral evasion distance right is determined by adding the right overlap and a safety distance right;
    selecting the smaller one of the lateral evasion distance left and lateral evasion distance right as a first ideal lateral evasion distance with the ECU; and
    determining a first ideal evasion trajectory on which the vehicle passes the object depending on the first ideal lateral evasion distance with the ECU, and
    steering the vehicle along the first ideal evasion trajectory with the ECU.

2. The method according to claim 1, further comprising:
    rejecting, if a second object is detected on the first ideal evasion trajectory, the ideal lateral evasion distance in favor of the other one of the lateral evasion distance left and lateral evasion distance right which is then determined to be a second ideal lateral evasion distance, and
    determining a second ideal evasion trajectory on which the vehicle passes the object depending on the second ideal lateral evasion distance.

3. The method according to claim 1, further comprising:
    comparing a measured distance between the vehicle and the object with a minimum predicted longitudinal distance which is a predetermined distance between the vehicle and the object to start a predetermined reaction based on current speed, steering capability and deceleration capability of the vehicle.

4. The method according to claim 3, further comprising:
    repeating the comparing of the measured distance between the vehicle and the object with the minimum predicted longitudinal distance until the minimum predicted longitudinal distance is equal to or smaller than a first predetermined distance, at which distance the vehicle starts partial braking.

5. The method according to claim 3, further comprising:
    repeating the comparing of the measured distance between the vehicle and the object with the minimum predicted longitudinal distance until the minimum predicted longitudinal distance is equal to or smaller than a second predetermined distance, at which distance the vehicle starts full braking.

6. The method according to claim 5, further comprising:
    repeating the comparing of the measured distance between the vehicle and the object with the minimum predicted longitudinal distance until the minimum predicted longitudinal distance is equal to or smaller than a third predetermined distance, which distance is the distance of a point of no return, wherein the point of no return is determined as the point at which the object can no longer be avoided by steering.

7. The method according to claim 6, further comprising:
    when it is determined that a driver is steering in the direction of the first or second ideal evasion trajectory, performing assisted steering according to the first or second ideal evasion trajectory;
    when it is determined that the driver is not steering in the direction of the first or second ideal evasion trajectory, and when the vehicle has reached a first predetermined distance but has not reached the third predetermined distance, performing automatic steering according to the first or second ideal evasion trajectory, and
    deactivating an emergency braking routine.

8. The method according to claim 2, wherein the first object or the second object is recognized by an environmental sensor, the environmental sensor comprising at least one of a camera, a RADAR sensor, a LIDAR sensor, a laser scanner, an infrared sensor, a stereoscopic camera, and an ultrasonic sensor.

* * * * *